United States Patent
Liu et al.

(10) Patent No.: US 11,969,697 B2
(45) Date of Patent: Apr. 30, 2024

(54) PHENYL-MODIFIED POLYDIMETHYLSILOXANE (PDMS) SEPARATION MEMBRANE, FABRICATION METHOD THEREOF, AND USE THEREOF IN SEPARATION OF AROMATIC COMPOUND

(71) Applicant: NANJING TECH UNIVERSITY, Jiangsu (CN)

(72) Inventors: Gongping Liu, Jiangsu (CN); Yang Pan, Jiangsu (CN); Wanqin Jin, Jiangsu (CN); Haipeng Zhu, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 17/970,595

(22) Filed: Oct. 21, 2022

(65) Prior Publication Data

US 2023/0129752 A1 Apr. 27, 2023

(30) Foreign Application Priority Data

Oct. 22, 2021 (CN) .......................... 202111232816.3

(51) Int. Cl.
| | | |
|---|---|---|
| *B01D 71/82* | (2006.01) | |
| *B01D 61/36* | (2006.01) | |
| *B01D 67/00* | (2006.01) | |
| *B01D 69/10* | (2006.01) | |
| *B01D 71/70* | (2006.01) | |
| *C02F 1/44* | (2023.01) | |

(Continued)

(52) U.S. Cl.
CPC ........... *B01D 71/82* (2013.01); *B01D 61/362* (2013.01); *B01D 67/0006* (2013.01); *B01D 67/0011* (2013.01); *B01D 67/0013* (2013.01); *B01D 69/107* (2022.08); *B01D 71/701* (2022.08); *C02F 1/448* (2013.01); *C02F 2101/32* (2013.01); *C02F 2101/34* (2013.01)

(58) Field of Classification Search
None
See application file for complete search history.

(56) References Cited

U.S. PATENT DOCUMENTS

2015/0267078 A1* 9/2015 Dooley ................ C09D 183/04
524/588

FOREIGN PATENT DOCUMENTS

CN 101455947 6/2009

OTHER PUBLICATIONS

Ju Yeon Lee, Jong Suk Lee, Jung-Hyun Lee, High performance and thermally stable PDMS pervaporation membranes prepared using a phenyl-containing tri-functional crosslinker for n-butanol recovery, Separation and Purification Technology, vol. 235, 2020, 116142 (Year: 2020).*

(Continued)

*Primary Examiner* — Jason M Greene
*Assistant Examiner* — Eric J McCullough
(74) *Attorney, Agent, or Firm* — JCIP GLOBAL INC.

(57) ABSTRACT

The present disclosure relates to a phenyl-modified polydimethylsiloxane (PDMS) separation membrane, a fabrication method thereof, and a use thereof in the separation of an aromatic compound, and belongs to the technical field of separation membrane materials. A phenyl-modified PDMS separation membrane comprising a substrate layer and a selective layer is provided.

7 Claims, 7 Drawing Sheets (51) Int. Cl.
*C02F 101/32* (2006.01)
*C02F 101/34* (2006.01)

(56) References Cited

OTHER PUBLICATIONS

Lei Li, et al., Composite PDMS membrane with high flux for the separation of organics from water by pervaporation, Journal of Membrane Science, vol. 243, Issues 1-2, 2004, pp. 177-187 (Year: 2004).*

P. Wu, et al., A fundamental study of organofunctionalised PDMS membranes for the pervaporative recovery of phenolic compounds from aqueous streams, Journal of Membrane Science, vol. 190, Issue 2, 2001, pp. 147-157 (Year: 2001).*

* cited by examiner

PHENYL-MODIFIED POLYDIMETHYLSILOXANE (PDMS) SEPARATION MEMBRANE, FABRICATION METHOD THEREOF, AND USE THEREOF IN SEPARATION OF AROMATIC COMPOUND

CROSS-REFERENCE TO RELATED APPLICATION

This application claims the priority benefit of China application serial no. 202111232816.3, filed on Oct. 22, 2021. The entirety of the above-mentioned patent application is hereby incorporated by reference herein and made a part of this specification.

TECHNICAL FIELD

The present disclosure relates to a phenyl-modified polydimethylsiloxane (PDMS) separation membrane, a fabrication method thereof, and a use thereof in the separation of an aromatic compound, and belongs to the technical field of separation membrane materials.

BACKGROUND

Efficient recovery of volatile organic compounds (VOCs) from aqueous solution has significant environmental and economic value. Aromatic compounds are a typical kind of VOCs with high boiling point and large molecule size. Selective recovery of these compounds currently involves distillation, solvent extraction and adsorption, showing considerable energy-intensity and complex post-treatment. Alternatively, pervaporation membrane technology served as an energy-efficient process is widely used in separation of organic-water or organic-organic mixtures. The separation performance of pervaporation process relies on the preferential sorption and diffusion of the components in the membrane materials. Therefore, the pervaporation process can overcome the limitation of thermodynamic vapor-liquid equilibrium and consume less energy as only the latent heat of evaporation is required compared with distillation separation. In addition, pervaporation process that can be operated at moderate temperature is favorable for purification of thermally sensitive organics such as aromatic substances in food industry.

Membrane with highly permeable and selective transport property is the key component to implement the pervaporation separation process. Polydimethylsiloxane (PDMS), an important type of polysiloxane, has been widely applied for VOCs recovery. In the past two decades, increasing attention has been paid on developing various approaches to modify PDMS membrane, and efforts have been successful in promoting selective transport of small organic molecules (e.g., ethanol, butanol) in a polymeric membrane layer. However, PDMS-based membranes remain challenges for fast and selective transport of aromatic compounds (e.g., phenol, 2-phenyl ethanol) with bigger molecule size. On the one hand, chemical modifications of PDMS membrane mainly focused on improving the affinity towards organic compounds to enhance the preferential sorption of the permeation process, while would result in excessive swelling of polymer chains to deteriorate the membrane selectivity and stability. On the other hand, many inorganic fillers (e.g., MFI zeolite molecular sieve, ZIF-8 metal-organic framework) with well-defined pores have been developed and successfully applied in the recovery process of small molecular alcohols. Unfortunately, pore size of the known inorganic fillers is generally less than 0.5 nm, which is too small for large-sized aromatic organics. Therefore, at present, the undesirable transport channels resulting from either intrinsic free volume of polymer chains or incorporated porous fillers failed to afford efficient and selective permeation of aromatic molecules.

SUMMARY

Figure 1:
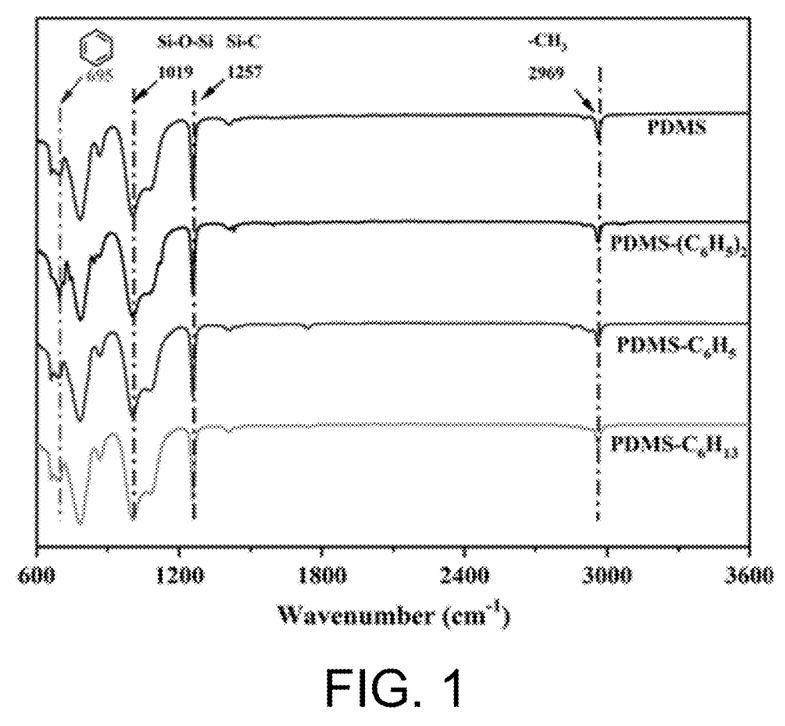
FIG. 1 shows infrared (IR) spectra of four PDMS membranes.

Since the conventional PDMS membranes have disadvantages such as low permeation flux and low separation selectivity when used in the separation of aromatic compounds, the present disclosure provides that a permeation transport highway is constructed for aromatic molecules by introducing a rigid molecular spacer into a polysiloxane chain. As illustrated in FIG. 1, p-dimethyl side groups on the main chain of PDMS are partially replaced by p-diphenyl that acts as the rigid molecular spacers between the adjacent polymer chains. As a result, the chain distance can be enlarged, allowing the rest methyl side groups higher mobility due to the lower steric hindrance. Meanwhile, the bulky phenyl side groups are expected to suppress the cooperative motion of the main chain and thus the entanglement of polymer chains. Therefore, lower resistance and additional freedoms could be offered to quickly transport aromatic molecules whose size is very close to the free volume size of the polysiloxane chains through the membrane.

A phenyl-modified PDMS separation membrane is provided, including a substrate layer and a selective layer, where the selective layer has a repeating unit structure shown in formula I or formula II:

where $R_1$ or $R_2$ is independently selected from the group consisting of H, a substituted or unsubstituted phenyl group, and a branched or unbranched alkyl group with 1 to 4 carbon atoms, and at least one of $R_1$ and $R_2$ is a substituted or unsubstituted phenyl group; and $R_3$ is a substituted or unsubstituted phenyl group.

Preferably, a material for the substrate layer is a porous polymer.

Preferably, the material for the substrate layer is selected from the group consisting of polyvinylidene fluoride (PVDF), polytetrafluoroethylene (PTFE), polyacrylonitrile (PAN), and polyethersulfone (PES).

A fabrication method of the phenyl-modified PDMS separation membrane is provided, including the following steps:

step 1. subjecting a hydroxyl-terminated PDMS-based compound, a crosslinker, and a catalyst to a crosslinking reaction in an organic solvent to obtain a casting solution; and step 2. coating the casting solution on a substrate, and conducting a thermal crosslinking reaction to obtain the phenyl-modified PDMS separation membrane;

where the hydroxyl-terminated PDMS-based compound and/or the crosslinker have/has a phenyl group.

Preferably, the hydroxyl-terminated PDMS-based compound has a structure represented by formula III:

(III)

Preferably, the crosslinker is selected from the group consisting of tetraethyl orthosilicate (TEOS) and phenyltriethoxysilane (PIES).

Preferably, the catalyst is an organic tin catalyst.

Preferably, a concentration of the hydroxyl-terminated PDMS-based compound in the organic solvent ranges from 5 wt % to 15 wt %.

Preferably, the hydroxyl-terminated PDMS-based compound, the crosslinker, and the catalyst are in a mass ratio of 100:(5-15):(0.1-5).

Preferably, the thermal crosslinking reaction is conducted at 50° C. to 85° C. for 1 h to 36 h.

The present disclosure provides a use of the phenyl-modified PDMS separation membrane in the separation of a solution including an organic compound.

Preferably, the organic compound is selected from the group consisting of an alcohol compound and an aromatic compound.

Preferably, the solution is an aqueous solution.

Preferably, a concentration of the organic compound in the solution is 0.1 wt % to 10 wt %.

Preferably, the phenyl-modified PDMS separation membrane is used to improve a flux of the organic compound during the separation.

The present disclosure provides a use of a phenyl group for increasing a spacing between molecular chains of a PDMS-based polymer.

In the present disclosure, during the fabrication process, PDMS bearing phenyl is used for a crosslinking reaction with a crosslinker to achieve the effective separation of a system containing a macromolecule (an aromatic compound), and the modification by phenyl can avoid the entanglement of the PDMS network and increase the spacing between polymer chains, such that the macromolecule can effectively permeate a membrane layer with excellent separation selectivity and permeability.

DETAILED DESCRIPTION OF THE EMBODIMENTS

The main raw materials adopted in the present disclosure include:

hydroxyl-terminated PDMS and hydroxyl-terminated PDMS-$(C_6H_5)_2$, with a molecular weight Mw of 80,000;

a crosslinker such as TEOS, PTES, and hexyltriethoxysilane; and a catalyst such as dibutyltin dilaurate.

EXAMPLE 1

The flexibility consistency between the main chain and the side groups results in the stacking of polymer chains of PDMS as a highly tangled structure. PDMS membranes for membrane separation typically require the use of TEOS as a crosslinker for curing.

A synthetic route of this example was as follows:

PDMS-(C₆H₅)₂

Fabrication Method:

A certain amount of hydroxyl-terminated PDMS-(C₆H₅)₂ was dissolved in n-heptane to obtain a 10 wt % polymer solution. TEOS was used as a crosslinker and dibutyltin dilaurate was used as a catalyst to allow the casting solution to be crosslinked, where the polymer, the crosslinker, and the catalyst were in the mass ratio of polymer: crosslinker: catalyst=100:10:1. When the casting solution achieved an appropriate viscosity, the casting solution was blade-coated by a scraper on a porous PVDF substrate to obtain a membrane. The fabricated composite membrane was subjected to evaporation at room temperature for 24 h, and then subjected to a thermal crosslinking reaction at 70° C. for 12 h to obtain the final polysiloxane composite membrane.

This polymer was denoted as PDMS-(C₆H₅)₂.

Side groups of phenyl and hexyl were introduced into the PDMS polymer network by replacing the conventional TEOS crosslinker with PTES and hexyltriethoxysilane, respectively. Comparative examples are provided below.

COMPARATIVE EXAMPLE 1

This comparative example was fabricated by procedures similar to those used for Example 1, except that a different polysiloxane was adopted and hydroxyl-terminated PDMS was used for the reaction.

A synthetic route of this comparative example was as follows:

PDMS

The other fabrication procedures were the same as those used in Example 1.

COMPARATIVE EXAMPLE 2

This comparative example was fabricated by procedures similar to those used for Example 1, except that a different polysiloxane and a different crosslinker were adopted, and hydroxyl-terminated PDMS and hexyltriethoxysilane were used for the reaction.

PDMS-C₆H₁₃

The other fabrication procedures were the same as those used in Example 1.

The two polymers were denoted as PDMS-C₆H₁₃.

Comparative EXAMPLE 3

This comparative example was fabricated by procedures similar to those used for Example 1, except that a different polysiloxane and a different crosslinker were adopted, and hydroxyl-terminated PDMS and PTES were used for the reaction.

PDMS-C₆H₅

The two polymers were denoted as PDMS-$C_6H_5$.

COMPARATIVE EXAMPLE 4

This comparative example was fabricated by procedures similar to those used for Example 1, except that PAN, PES, and PVDF were separately used as the substrate.

IR Characterization:

The chemical structures of the four polysiloxanes in Example 1 and comparative examples were each characterized by Fourier transform infrared spectroscopy (FTIR) (FIG. 1). The spectra shows the peak at 1,019 $cm^{-1}$ (asymmetrical stretching vibration of Si—O—Si), the peak at 1,257 $cm^{-1}$ (bending vibration of Si—$CH_3$), and the peak at 2,969 $cm^{-1}$ (asymmetrical stretching vibration of —$CH_3$). It is confirmed that the corresponding product is obtained after the crosslinking reaction.

Figure 2:
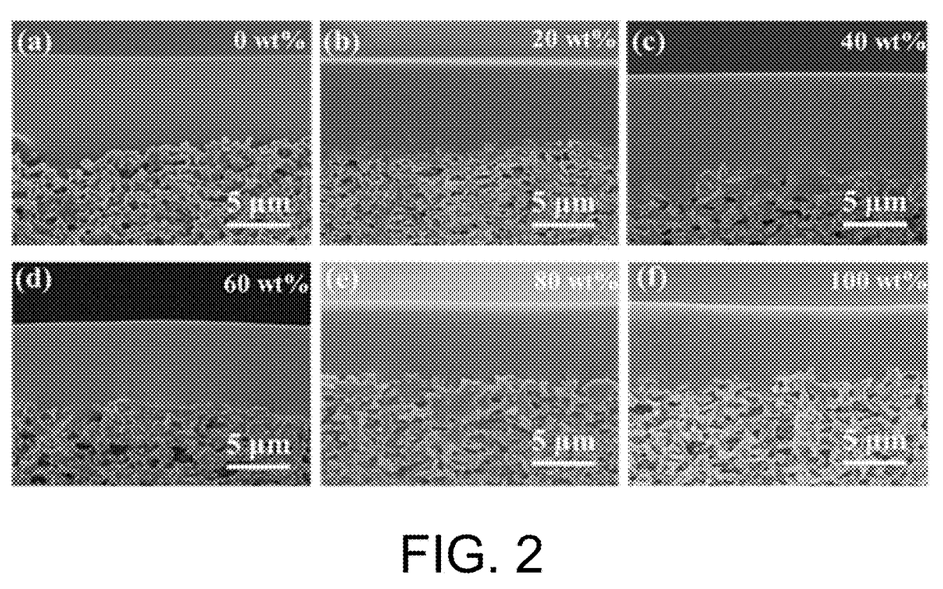
FIG. 2 shows scanning electron microscopy (SEM) images of cross sections of PDMS-$(C_6H_5)_2$/PDMS/PVDF blend membranes with different PDMS-$(C_6H_5)_2$ contents (from a to f, the PDMS-$(C_6H_5)_2$ content ranges from 0 wt % to 100 wt %).

SEM Characterization:

FIG. 2 show SEM images of cross sections of PDMS-$(C_6H_5)_2$/PDMS/PVDF blend membranes with different PDMS-$(C_6H_5)_2$ contents, where a to f show PDMS-$(C_6H_5)_2$ contents of 0 wt % to 100 wt %.

Figure 3:
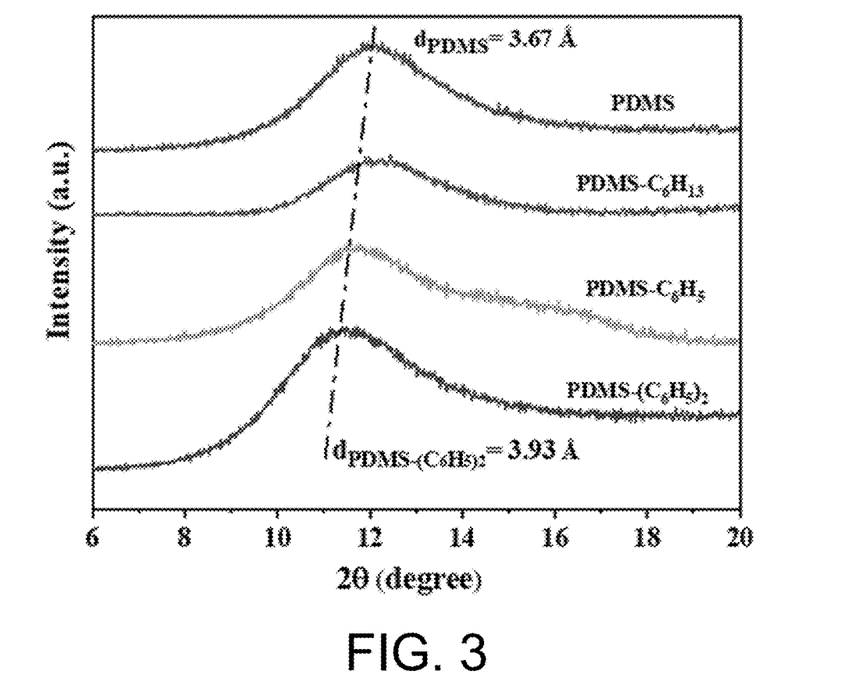
FIG. 3 shows X-ray diffractometry (XRD) patterns of four silicone rubber membranes, where chain spacings of PDMS and PDMS-$(C_6H_5)_2$ are indicated.

XRD Characterization:

The stacking behavior of PDMS chains was verified by XRD. As shown in FIG. 3, the PDMS exhibits a characteristic peak at 12.1°, corresponding to a chain spacing of 3.67 Å calculated by Bragg equation. After a $C_6$ side group (phenyl or hexyl) with larger size than methyl is introduced, the chain spacing of the polymer was enlarged. Moreover, compared with PDMS and PDMS-$C_6H_{13}$, PDMS-$(C_6H_5)_2$ and PDMS-$C_6H_5$ underwent substantial chain spacing enlargement, indicating that the phenyl side group plays a critical role as a molecular spacer. Compared with the random phenyl side group introduced by the condensation reaction, the p-diphenyl side group in PDMS-$(C_6H_5)_2$ generates the more significant chain spacing enlargement effect, and PDMS-$(C_6H_5)_2$ has the largest chain spacing of 3.93 Å.

Figure 4:
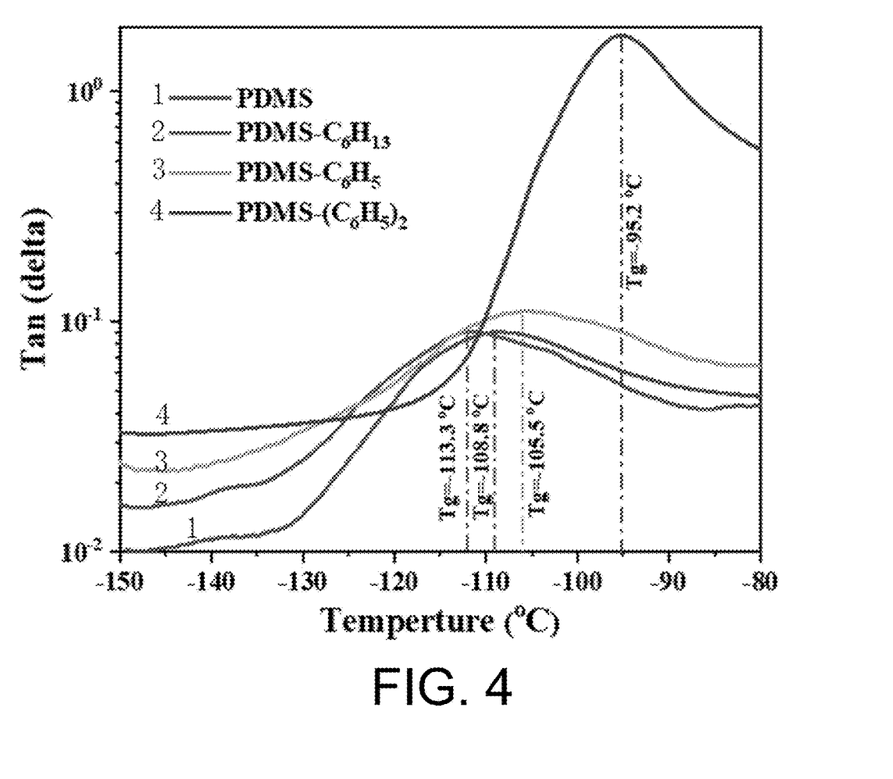
FIG. 4 shows dynamic mechanical analysis (DMA) spectra of four silicone rubber membranes.

DMA Test:

The interaction between PDMS segments was quantified through loss factor determined by a DMA test. The higher the loss factor is, the more energy is consumed due to the friction between polymer segments. As shown in FIG. 4, PDMS-$(C_6H_5)_2$ exhibits the highest loss factor, which is much higher than that of PDMS. As discussed above, the introduction of the rigid molecular spacer with high steric hindrance inhibits the cooperative motion of segments at nano-scale, which finally relieves the excessive entanglement of polymer chains. In this case, it is more likely to occur friction between polymer segments and produce extra free volume between adjacent polymer segments, even though the entire main chain loses mobility due to the introduction of phenyl side group. Moreover, the loss factor is also very sensitive to the glass transition temperature that can also quantitatively reflect the chain mobility. According to DMA test data, the four polymers rank as follows in terms of mobility: PDMS-$(C_6H_5)_2$<PDMS-$C_6H_5$<PDMS-$C_6H_{13}$, PDMS, which is consistent with the glass transition temperature results obtained by differential scanning calorimetry (DSC).

TABLE 1

| Glass transition temperature | |
|---|---|
| Samples | Glass transition temperature (° C.) |
| PDMS | −122.7 |
| PDMS-$C_6H_{13}$ | −122.7 |

TABLE 1-continued

| Glass transition temperature | |
|---|---|
| Samples | Glass transition temperature (° C.) |
| PDMS-$C_6H_5$ | −118.6 |
| PDMS-$(C_6H_5)_2$ | −107.4 |

$^1$H-NMR Test

Figure 5:
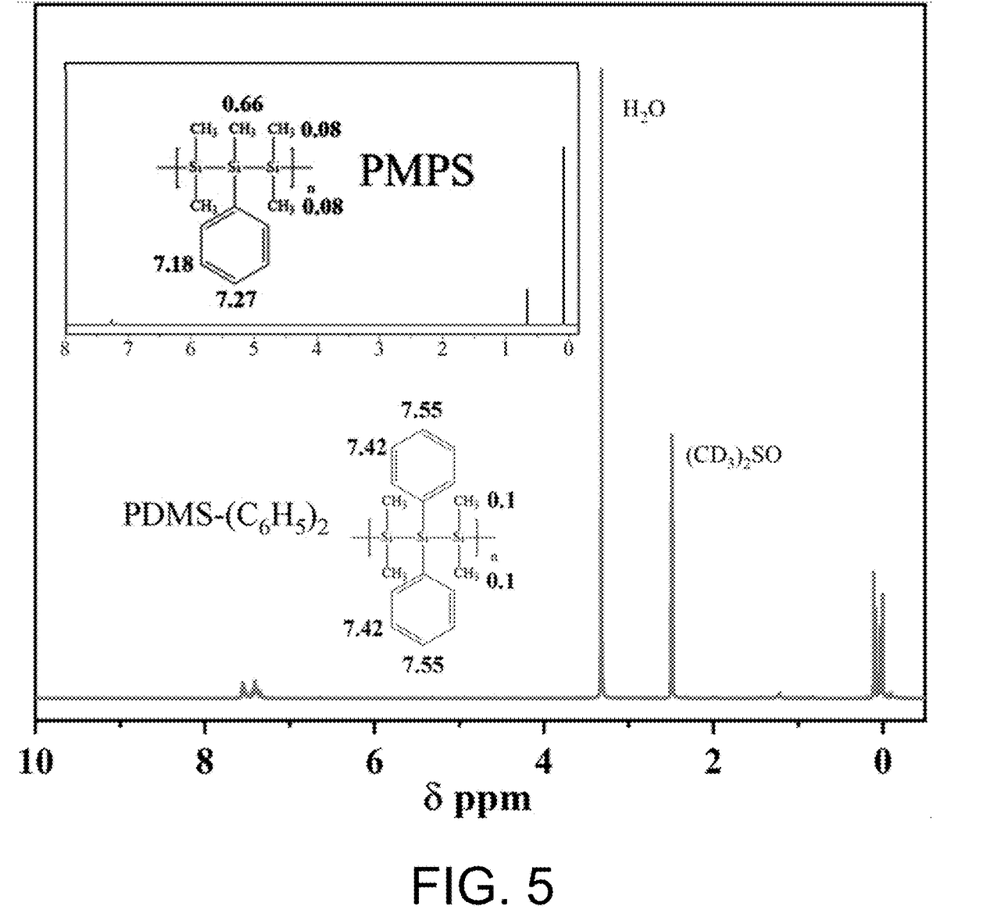
FIG. 5 shows a hydrogen nuclear magnetic resonance ($^1$H NMR) spectrum of PDMS-$(C_6H_5)_2$, where the insets show a repeating unit of PDMS-$(C_6H_5)_2$ and a $^1$H NMR spectrum of polymethylphenylsiloxane (PMPS) predicted by ChemDraw software.

As shown in FIG. 5, two kinds of hydrogen shifts (0.66 ppm and 0.08 ppm) exist in the PMPS according to HNMR analysis, indicating that a part of methyl groups were substituted by phenyl, and a hydrogen shift of methyl at 0.1 ppm can be observed in the PDMS-$(C_6H_5)_2$ spectrum, indicating that one-third of p-dimethyl groups of the PDMS-$(C_6H_5)_2$ fabricated in Example 1 were substituted by p-diphenyl (molar ratio).

Organic Molecule Separation Performance Test

Figure 6:
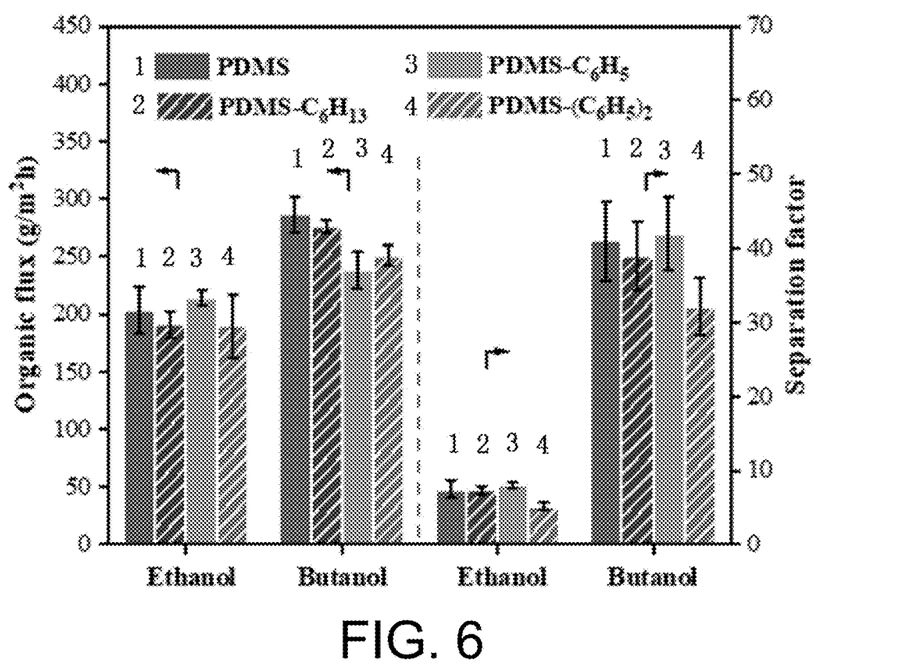
FIG. 6 shows the performance of four silicone rubber composite membranes in the separation of ethanol/water (feed concentration: 5 wt %, feed temperature: 40° C.) and butanol/water (feed concentration: 1 wt %, feed temperature: 40° C.) systems.
Figure 7:
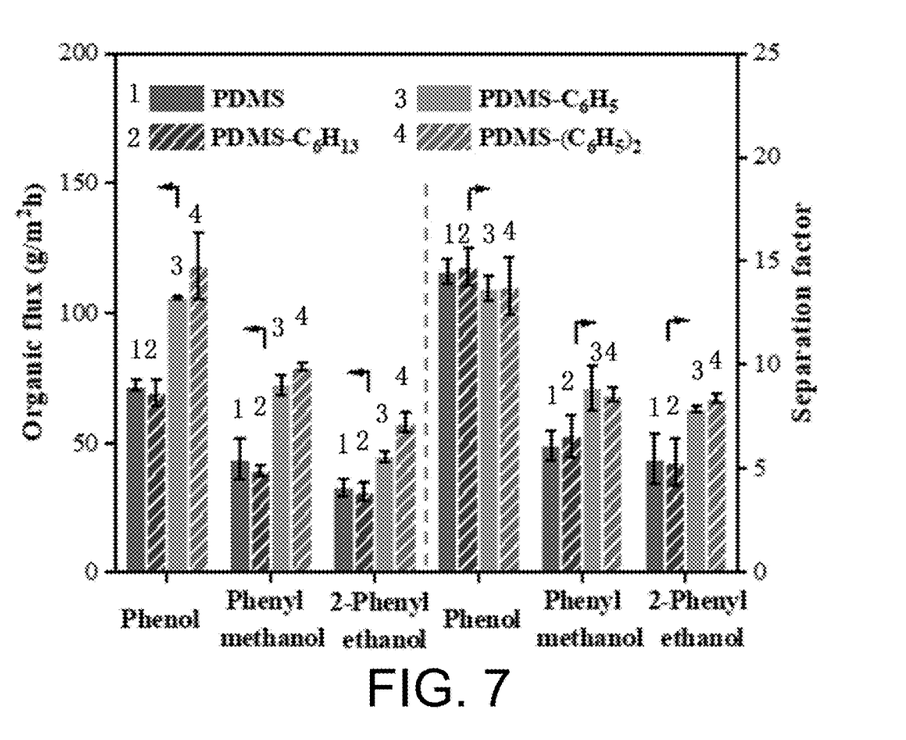
FIG. 7 shows the performance of four silicone rubber composite membranes in the separation of phenol/water, phenyl methanol/water, and 2-phenyl ethanol/water systems (feed concentration: 1 wt %, feed temperature 50° C.).
Figure 8:
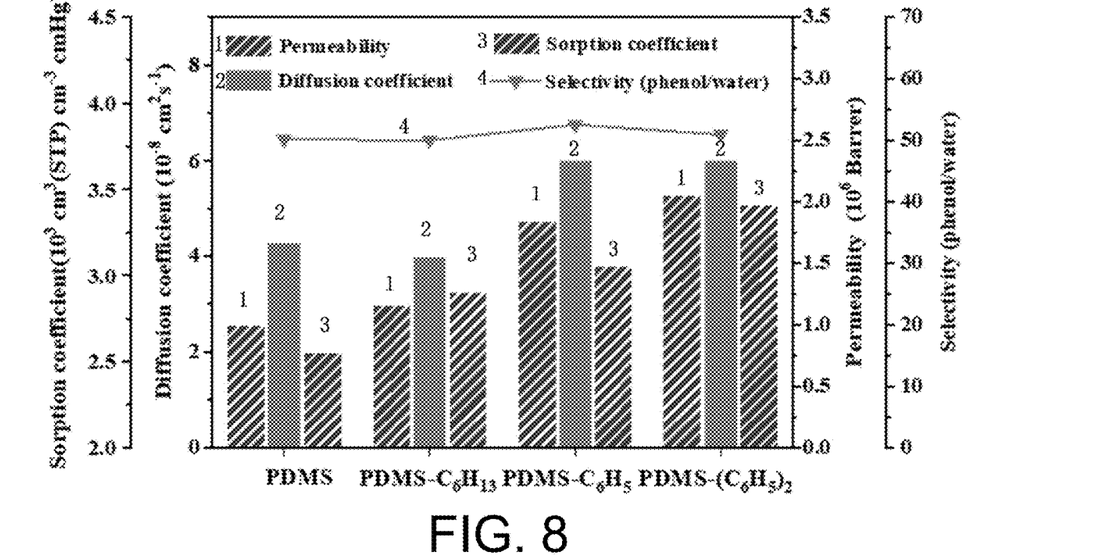
FIG. 8 shows the mass transfer property of phenol molecules in four polymers.
Figure 9:
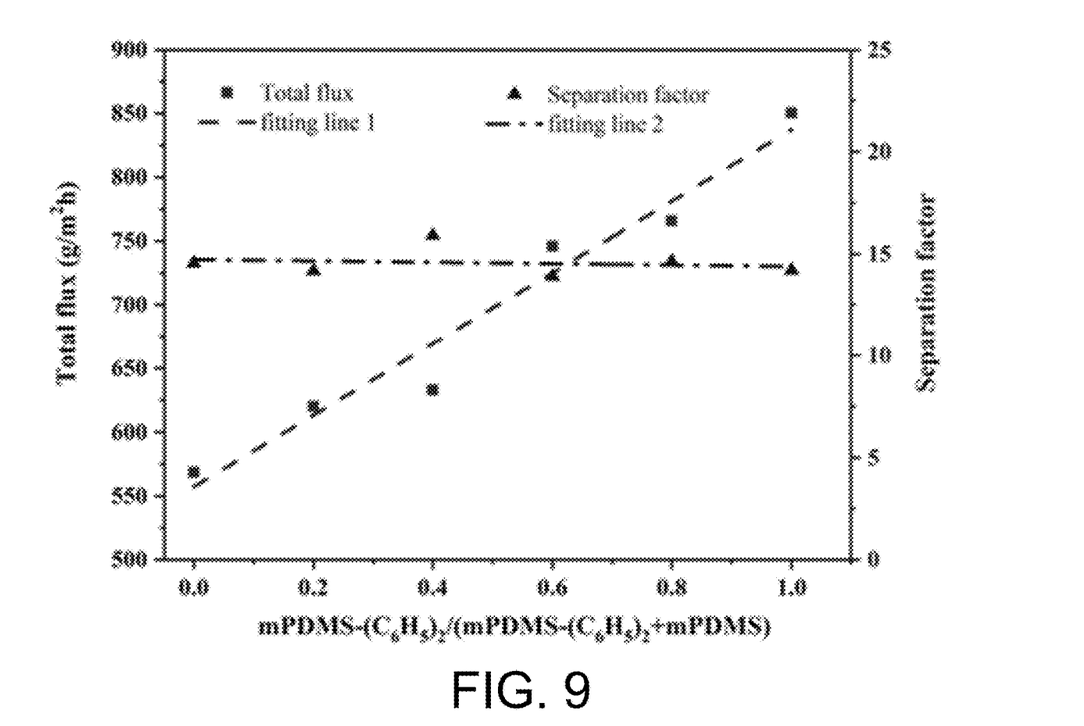
FIG. 9 shows the effect of different blending amounts on the performance of PDMS/PDMS-$(C_6H_5)_2$/PVDF blend composite membranes in the separation of a phenol/water system (feed concentration: 1 wt %, feed temperature: 50° C.).

To investigate the transport differences of VOC molecules with different sizes in membrane materials with different structures, the performance of the above membranes to separate ethanol (4.5 Å), butanol (5 Å), phenol (6.9 Å), phenyl methanol, and phenyl ethanol from water (3 Å) was systematically investigated. The kinetic sizes of phenyl methanol and phenyl ethanol have not been reported, but the geometric draw sizes of these two substances are larger than that of phenol. The permeation fluxes and separation factors for separation of these systems are shown in FIG. 6 and FIG. 7. All silane polymers have similar fluxes for small organic molecules (such as ethanol and butanol), but PDMS-$(C_6H_5)_2$ and PDMS-$C_6H_5$ have much higher fluxes than PDMS-$C_6H_{13}$ and PDMS for relatively large molecules such as phenol, phenyl methanol, and phenyl ethanol. Moreover, compared with PDMS and PDMS-$C_6H_{13}$, PDMS-$(C_6H_5)_2$ has a low separation factor for small organic molecules but a high separation factor for large organic molecules. In order to further verify a promotion effect of phenyl on the separation of large-sized VOC molecules by a silane separation membrane, PDMS and PDMS-$(C_6H_5)_2$ were mixed according to a specified mass ratio (2/8, 4/6, 6/4, and 8/2) to fabricate a PDMS/PDMS-$(C_6H_5)_2$ blend membrane with a thickness of about 7.5 μm. During a test process of a phenol/water system, it was found that a permeation flux of the membrane increased continuously with the increase of p-diphenyl, but the separation factor was basically maintained at 15. PDMS-$(C_6H_5)_2$ significantly enhanced the selective permeation of phenol molecules. Apparently, the introduction of phenyl only promoted the selective permeation of large-sized VOC molecules relative to water molecules.

Characteristic Test of Separation Membranes on Different Substrates

Figure 10:
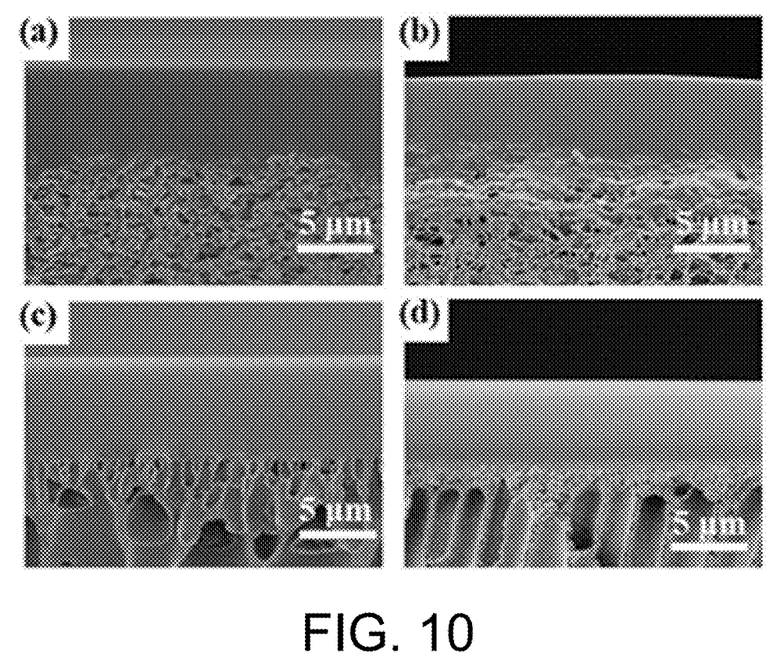
FIG. 10 shows SEM images of cross sections of PDMS-$(C_6H_5)_2$ composite membranes fabricated by different substrates.
Figure 11:
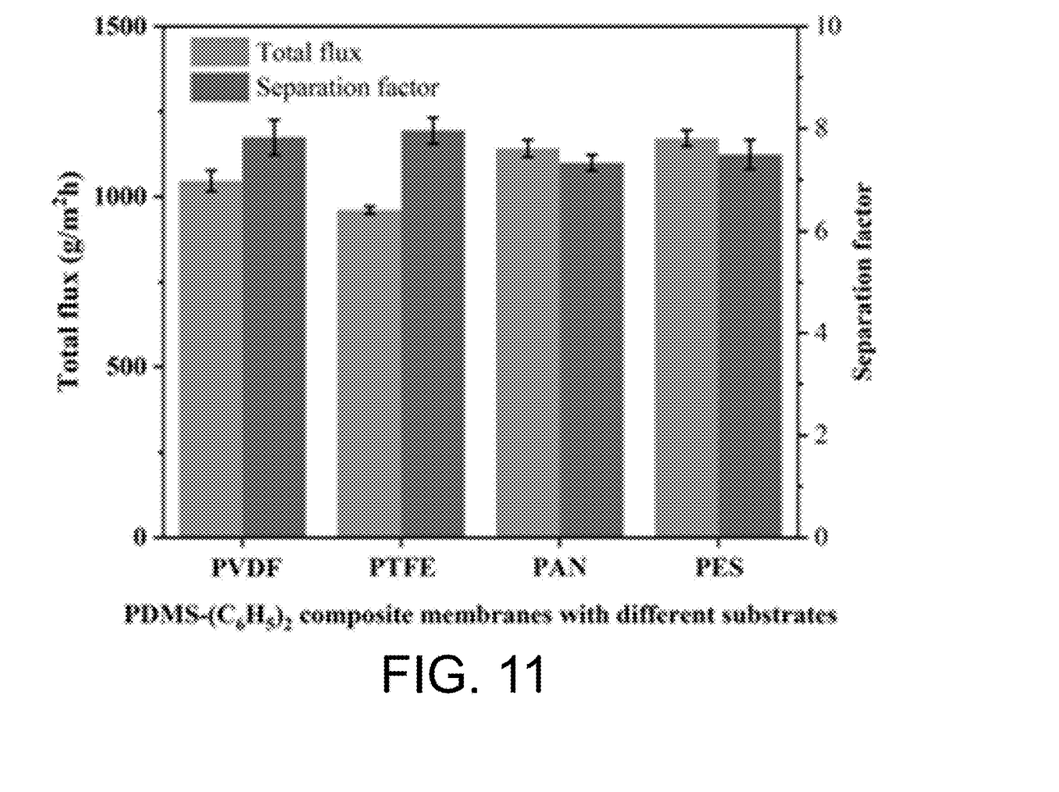
FIG. 11 shows the separation performance of PDMS-$(C_6H_5)_2$ composite membranes fabricated by different substrates for an ethanol/water solution (feed concentration: 5 wt %, feed temperature: 40° C.).
Figure 12:
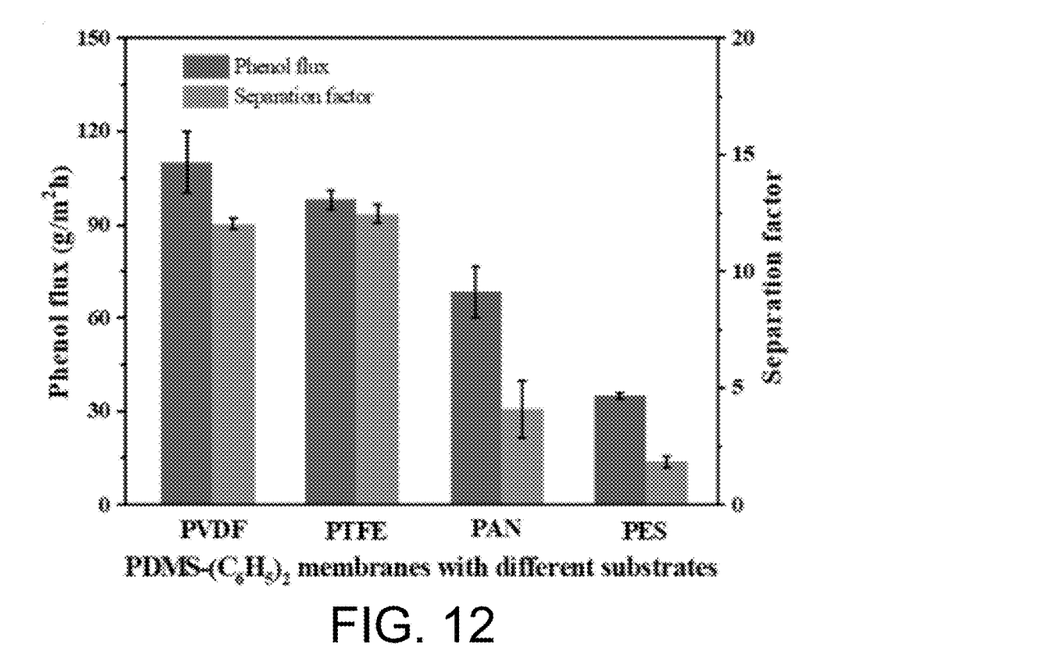
FIG. 12 shows the separation performance of PDMS-$(C_6H_5)_2$ composite membranes fabricated by different substrates for a phenol/water solution (feed concentration: 1 wt %, feed temperature: 50° C.).

In Example 1 and Comparative Example 4, four substrates were used to fabricate separation membranes. The PAN and PES substrates are hydrophilic and each have an asymmetrical pore structure, including a sponge pore layer and a finger-like pore layer. As shown in FIG. 10, the PAN and PES surfaces have a pore size of about 25 nm. The PVDF and PTFE substrates are hydrophobic and have sponge pores of 200 nm. FIG. 11 and FIG. 12 show the separation performance of PDMS-$(C_6H_5)_2$ composite membranes on different substrates for ethanol and phenol, respectively, and it can be seen from the figures that the PDMS-$(C_6H_5)_2$ composite membranes fabricated with the hydrophobic substrates (PVDF and PTFE) exhibit excellent phenol fluxes and separation factors, which are much higher than that of the composite membranes fabricated with the hydrophilic substrates.

Figure 13:
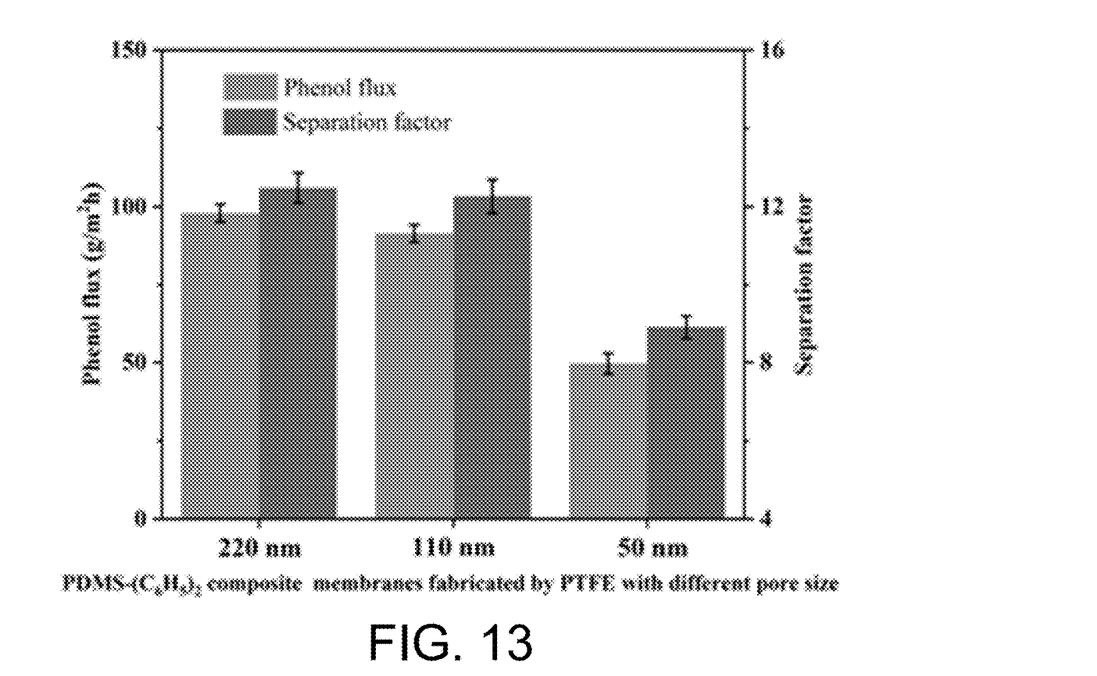
FIG. 13 shows the separation performance of PDMS-$(C_6H_5)_2$/PTFE composite membranes fabricated by PTFE substrates with different pore sizes for a phenol/water system (feed: 1 wt % phenol/water solution, feed temperature: 50° C.).

The above-mentioned separation membranes fabricated on different substrates have large differences in performance, because a thickness of a selection layer is basically maintained at 6 μm; and this phenomenon is not observed in the separation of an ethanol/water system. In other words, the separation factors and fluxes of the four PDMS membranes for ethanol are independent of the substrates. Further, PTFE with hydrophobicity was used as a substrate, but a pore size thereof was relatively small (110 nm and 50 nm). As shown in FIG. 13, when a pore size of the substrate reaches 50 nm, the membrane performance begins to decline. This indicates that a pore size of a substrate is a key factor affecting the separation of a phenol/water system by the composite membrane, rather than the hydrophilic-hydrophobic property of a substrate. During pervaporation, when reaching a boundary of a selection layer, a permeated molecule passes through a substrate layer in a gaseous state. Once a mean free path (MFP) of a permeate is larger than a pore size of a substrate, the permeate diffuses in the form of Knudsen flow to cause a rapid drop in a partial pressure of the permeate. The smaller the pore size of the substrate, the easier it is to cause pore condensation and thus cause membrane pore blockage. The higher the size and boiling point of a permeate molecule, the more pronounced the pore condensation, indicating that a pore size of a substrate can significantly affect the performance of PDMS-(C6H5)2 in the separation of a phenol/water system.

What is claimed is:

1. A method of using a phenyl-modified polydimethylsiloxane (PDMS) separation membrane in the separation of a solution comprising an organic compound being phenol, phenyl methanol, or phenyl ethanol,
wherein the phenyl-modified PDMS separation membrane comprises a substrate layer and a selective layer, wherein the phenyl-modified PDMS separation membrane is fabricated through the following steps:
step 1. subjecting a hydroxyl-terminated PDMS-based compound, a crosslinker, and a catalyst to a crosslinking reaction in an organic solvent to obtain a casting solution; and
step 2. coating the casting solution on a substrate, and conducting a thermal crosslinking reaction to obtain the phenyl-modified PDMS separation membrane;
wherein the hydroxyl-terminated PDMS-based compound has a structure represented by formula III:

the crosslinker is tetraethyl orthosilicate; a concentration of the hydroxyl-terminated PDMS-based compound in the organic solvent ranges from 5 wt % to 15 wt %;
the hydroxyl-terminated PDMS-based compound has a molecular weight Mw of 80,000;
the hydroxyl-terminated PDMS-based compound, the crosslinker, and the catalyst are in a mass ratio of 100:(5-15):(0.1-5); and
a material for the substrate layer is polytetrafluoroethylene with a pore size of 110 nm to 220 nm.

2. The method according to claim 1, wherein the catalyst is an organic tin catalyst.

3. The method according to claim 1, wherein the thermal crosslinking reaction is conducted at 50° C. to 85° C.

4. The method according to claim 1, wherein the thermal crosslinking reaction is conducted for 1 h to 36 h.

5. The method according to claim 1, wherein the organic compound is selected from the group consisting of an alcohol compound and an aromatic compound.

6. The method according to claim 1, wherein the solution is an aqueous solution.

7. The method according to claim 1, wherein a concentration of the organic compound in the solution is 0.1 wt % to 10 wt %.

* * * * *